(12) United States Patent
Ohashi et al.

(10) Patent No.: US 7,243,000 B2
(45) Date of Patent: Jul. 10, 2007

(54) METHOD AND APPARATUS FOR AUTOMATICALLY DIVIDING MACHINING PROCESS IN AUTOMATIC PROGRAMMING APPARATUS

(75) Inventors: Hajime Ohashi, Aichi (JP); Kazuhiro Kikata, Aichi (JP); Morikuni Kimura, Aichi (JP); Tetsuya Itoh, Aichi (JP)

(73) Assignee: Yamazaki Mazak Corporation, Aichi Pref. (JP)

( * ) Notice: Subject to any disclaimer, the term of this patent is extended or adjusted under 35 U.S.C. 154(b) by 0 days.

(21) Appl. No.: 11/319,823

(22) Filed: Dec. 27, 2005

(65) Prior Publication Data
US 2006/0142892 A1    Jun. 29, 2006

(30) Foreign Application Priority Data
Dec. 28, 2004    (JP) .............................. 2004-379721

(51) Int. Cl.
G06F 19/00    (2006.01)
(52) U.S. Cl. .................. 700/183; 700/159; 700/179; 700/180; 700/182; 700/187
(58) Field of Classification Search .................. 700/97, 700/98, 159, 169, 179, 180, 182, 173, 183, 700/184, 187
See application file for complete search history.

(56) References Cited

U.S. PATENT DOCUMENTS

| | | | |
|---|---|---|---|
| 6,400,998 B1 * | 6/2002 | Yamazaki et al. .......... | 700/183 |
| 6,671,571 B1 * | 12/2003 | Matsumiya et al. ........ | 700/172 |
| 6,741,905 B1 * | 5/2004 | Fishman et al. ............ | 700/180 |
| 6,804,575 B2 * | 10/2004 | Sagawa et al. ............. | 700/179 |
| 6,850,814 B2 * | 2/2005 | Kamiya ...................... | 700/182 |
| 6,972,389 B2 * | 12/2005 | Ogata et al. ................ | 700/162 |
| 7,062,352 B2 * | 6/2006 | Hasebe et al. .............. | 700/180 |
| 2002/0193906 A1 * | 12/2002 | Sugiyama et al. .......... | 700/179 |
| 2003/0171842 A1 * | 9/2003 | Teramoto et al. ........... | 700/182 |
| 2006/0259181 A1 * | 11/2006 | Kamiya et al. ............. | 700/180 |

FOREIGN PATENT DOCUMENTS

| | | |
|---|---|---|
| JP | 04-025346 | 1/1992 |
| WO | 2002/095512 | 11/2002 |

* cited by examiner

*Primary Examiner*—Kidest Bahta
*Assistant Examiner*—Charles Kasenge
(74) *Attorney, Agent, or Firm*—Sheridan Ross P.C.

(57) ABSTRACT

An automatic programming apparatus includes a process division control section, which automatically divides a machining process executed to obtain a predetermined product shape from a material shape of a workpiece. The process division control section computes a removal shape, which is a shape to be removed from the material shape when executing the machining process, based on the material shape and the product shape. The process division control section defines a reference machining boundary that intersects a reference axis defined on the product shape and divides the volume of the removal shape into two equal parts. The process division control section defines, on the removal shape, a process division boundary that intersects the reference axis based on the reference machining boundary and the profile of the product shape. The machining process is divided into a first process and a second process with the process division boundary.

12 Claims, 7 Drawing Sheets

| No. | Process Name | Machining Type | Shape Data |
|---|---|---|---|
| 1 | 1 | Drilling | 00100 |
| 2 | 1 | First End Face Turning | 00043 |
| 3 | 1 | Outer Diameter Turning | 00066 |
| 4 | 1 | Face Milling | 00209 |
| 5 | 1 | Inner Diameter Turning | 00346 |
|  |  |  |  |
|  |  |  |  |
|  |  |  |  |
| 10 | 1 | Transfer Process | - |
| 11 | 2 | Second End Face Turning | 00913 |
| 12 | 2 | Outer Diameter Turning | 00241 |
| 13 | 2 | Inner Diameter Turning | 00484 |
|  |  |  |  |

METHOD AND APPARATUS FOR AUTOMATICALLY DIVIDING MACHINING PROCESS IN AUTOMATIC PROGRAMMING APPARATUS

BACKGROUND OF THE INVENTION

The present invention relates to a method and apparatus for automatically dividing a machining process executed to obtain a predetermined product shape from a material shape of a workpiece. The method and apparatus are applied to an automatic programming apparatus.

In the prior art, numerical control (NC) machine tool having two main spindles facing each other have been proposed. In such a NC machine tool, while holding a workpiece with a chuck of one of the main spindles (hereinafter, referred to as a first main spindle), part of the workpiece not held by the chuck of the first main spindle is machined. The workpiece is then received by a chuck of the other main spindle (hereinafter, referred to as a second main spindle), and while the workpiece is held by the chuck of the second main spindle, part of the workpiece not held by the chuck of the second main spindle is machined. In this specification, the process for machining part of the workpiece not held by the chuck of the first main spindle will be referred to as a first process, and the process for machining part of the workpiece not held by the chuck of the second main spindle will be referred to as a second process.

Japanese Laid-Open Patent Publication No. 4-25346 discloses an interactive automatic programming apparatus that automatically divides the machining process for the workpiece into the first process and the second process.

This apparatus requires an operator to enter the profile line of the material shape of the workpiece and the profile line of the product shape to be obtained by machining. On the profile line of the product shape is defined a starting point (input starting point) for inputting the profile line. When the product shape has a through hole, for example, the input starting point is defined at an arbitrary portion on the inner profile line of the product shape that defines the through hole. Also, a portion on the outer profile of the product shape where the dimension of the outer profile is the greatest and that is furthest from the reference end face of the product shape in the axial direction of the workpiece is defined as the outer process division point. Furthermore, an inner division line that passes through the input starting point and is perpendicular to the axis of the workpiece is defined, and an outer division line that passes through the outer process division point and is perpendicular to the axis of the workpiece is defined. Part of the workpiece to be machined is divided into a fist area to be machined in the first process and a second area to be machined in the second process with the inner and outer division lines serving as boundaries.

Furthermore, International Publication No. 2002/095512 discloses a programming apparatus that creates a machining program for a multi-tasking machine that is capable of executing both milling and turning. In this apparatus, based on the material shape of the workpiece and the product shape to be obtained by machining, part of the workpiece to be machined is divided into a milling area and a turning area. In the apparatus of the above publication No. 4-25346, a portion on the outer profile of the product shape where the dimension of the outer profile is the greatest and that is furthest from the reference end face of the product shape in the axial direction of the workpiece is defined as the outer process division point. That is, in the apparatus of this publication, the outer process division point is defined without considering the volume of the machining target area in the first process and the volume of the machining target area in the second process. Therefore, a significant difference may be caused between the volume of the machining target area in the first process and the volume of the machining target area in the second process. This causes a significant difference between the machining time required for the first process and the machining time required for the second process, resulting in the decrease of the machining efficiency.

International Publication No. 2002/095512 simply discloses a method for dividing the machining target part of the workpiece into the milling area and the turning area, and does not disclose a method for dividing the machining process taking into consideration of the volume of the machining target parts.

SUMMARY OF THE INVENTION

Accordingly, it is an objective of the present invention to provide a method and an apparatus for automatically creating a machining program including a machining process dividing procedure that improves the machining efficiency.

To achieve the foregoing and other objectives and in accordance with the purpose of the present invention, a method for automatically dividing a machining process executed to obtain a predetermined product shape from a material shape of a workpiece is provided. The method is applied to an automatic programming apparatus. The method includes: computing a removal shape, which is a shape to be removed from the material shape when executing the machining process, based on the material shape and the product shape; determining a reference machining boundary that intersects a reference axis defined on the product shape and divides the volume of the removal shape into two equal parts; defining, on the removal shape, a process division boundary that intersects the reference axis, based on the reference machining boundary and the profile of the product shape; and dividing the machining process into a first process and a second process with the process division boundary.

The present invention also provides an apparatus for automatically dividing a machining process executed to obtain a predetermined product shape from a material shape of a workpiece. The apparatus is applied to an automatic programming apparatus. The apparatus includes a removal shape computing section, a reference machining boundary determining section, a process division boundary defining section, and a process dividing section. The removal shape computing section computes a removal shape, which is a shape to be removed from the material shape when executing the machining process, based on the material shape and the product shape. The reference machining boundary determining section defines a reference machining boundary that intersects a reference axis defined on the product shape and divides the volume of the removal shape into two equal parts. The process division boundary defining section defines, on the removal shape, a process division boundary that intersects the reference axis based on the reference machining boundary and the profile of the product shape. The process dividing section divides the machining process into a first process and a second process with the process division boundary.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
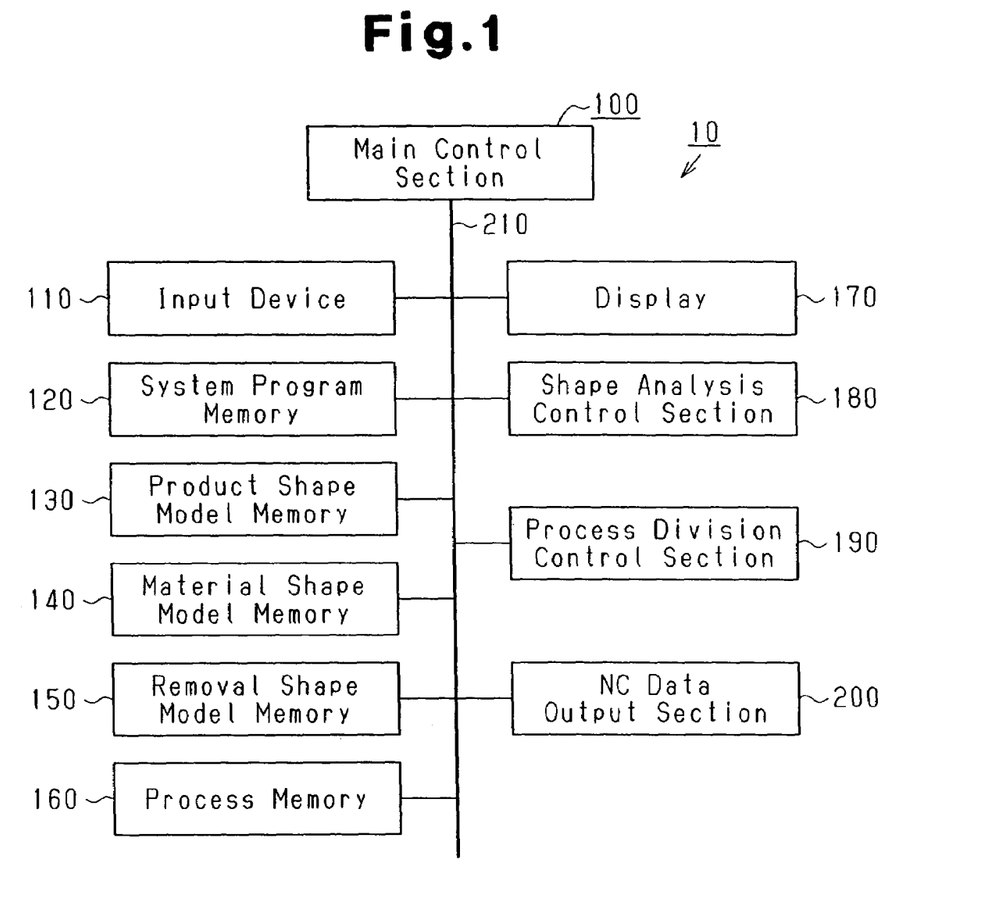
FIG. 1 is a block diagram illustrating an automatic programming apparatus according to one embodiment of the present invention.

One embodiment of the present invention will now be described with reference to FIGS. 1 to 10. FIG. 1 shows an interactive automatic programming apparatus 10 (hereinafter, simply referred to as the automatic programming apparatus) according to the preferred embodiment. A numerical control (NC) machining program written by the automatic programming apparatus 10 is applied to a multi-tasking machine (not shown), which serves as an NC machine tool. The NC machine tool to which the NC machining program is applied is of the type that has two main spindles (a first main spindle and a second main spindle), which face each other. With the NC machine tool, while holding a workpiece with a chuck of the first main spindle, part of the workpiece not held by the chuck of the first main spindle is machined (a first process). The workpiece is then received by a chuck of the second main spindle. While the workpiece is held by the chuck of the second main spindle, part of the workpiece not held by the chuck of the second main spindle is machined (a second process). That is, the machining process for the workpiece is divided into the first process and the second process.

As shown in FIG. 1, the automatic programming apparatus 10 includes a main control section 100, an input device 110, a system program memory 120, a product shape model memory 130, a material shape model memory 140, a removal shape model memory 150, a process memory 160, a display 170, a shape analysis control section 180, a process division control section 190, and an NC data output section 200. The above mentioned components 110 to 200 are electrically connected to the main control section 100 via a bus 210. The main control section 100, the shape analysis control section 180, and the process division control section 190 are configured by a single central processing unit (CPU), and represent functions of the CPU. The main control section 100 performs an overall control of the entire automatic programming apparatus 10. The input device 110 is, for example, a keyboard.

The system program memory 120 is configured by a ROM, and stores various programs such as an automatic programming program. The main control section 100 creates, in accordance with the automatic programming program, the NC machining program based on various data input by an operator using the input device 110. The main control section 100 stores the created NC machining program in the process memory 160.

The product shape model memory 130, the material shape model memory 140, and the removal shape model memory 150 are configured by a RAM. The product shape model memory 130 stores the product shape to be obtained by machining the workpiece, that is, a solid model data that represents the three-dimensional shape of the product. The material shape model memory 140 stores the material shape of the workpiece, that is, a solid model data that represents the three-dimensional shape of the material. The removal shape model memory 150 is capable of storing a solid model data that represents the removal shape (the three-dimensional shape) computed by the process division control section 190. The removal shape is the shape of a part removed from the material shape to obtain the product shape, that is, the shape of the remaining part when the product shape is removed from the material shape.

The display 170 is, for example, a liquid crystal display. The NC data output section 200 is a section for recording the created NC data on an external storing medium such as paper tape. In the preferred embodiment, the main control section 100 functions as a process dividing section. Also, the process division control section 190 functions as a removal shape computing section, a reference machining boundary determining section, and a process division boundary defining section.

Figure 2:
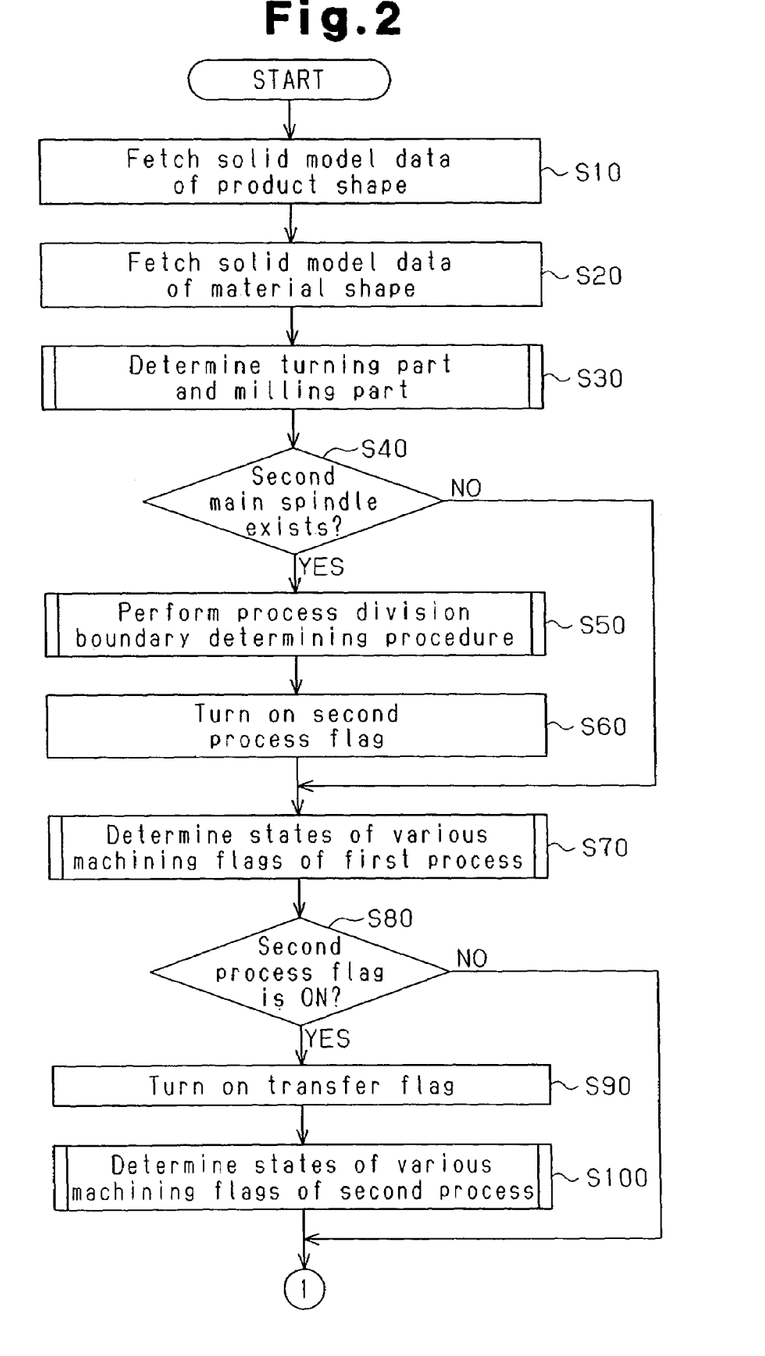
FIG. 2 is a flowchart showing an NC machining programming procedure executed by the main control section of the automatic programming apparatus of FIG. 1.
Figure 3:
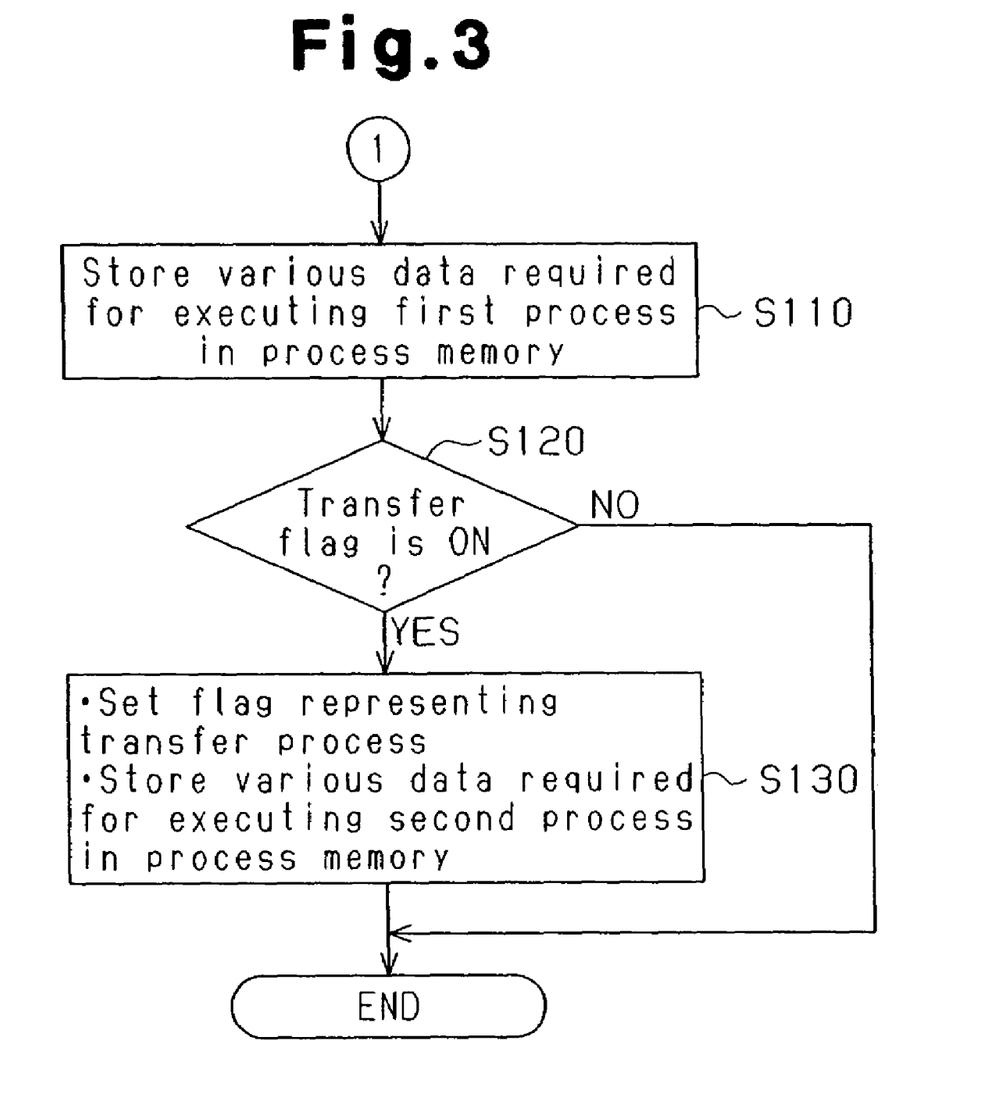
FIG. 3 is a continuation of the flowchart of FIG. 2.
Figure 4:
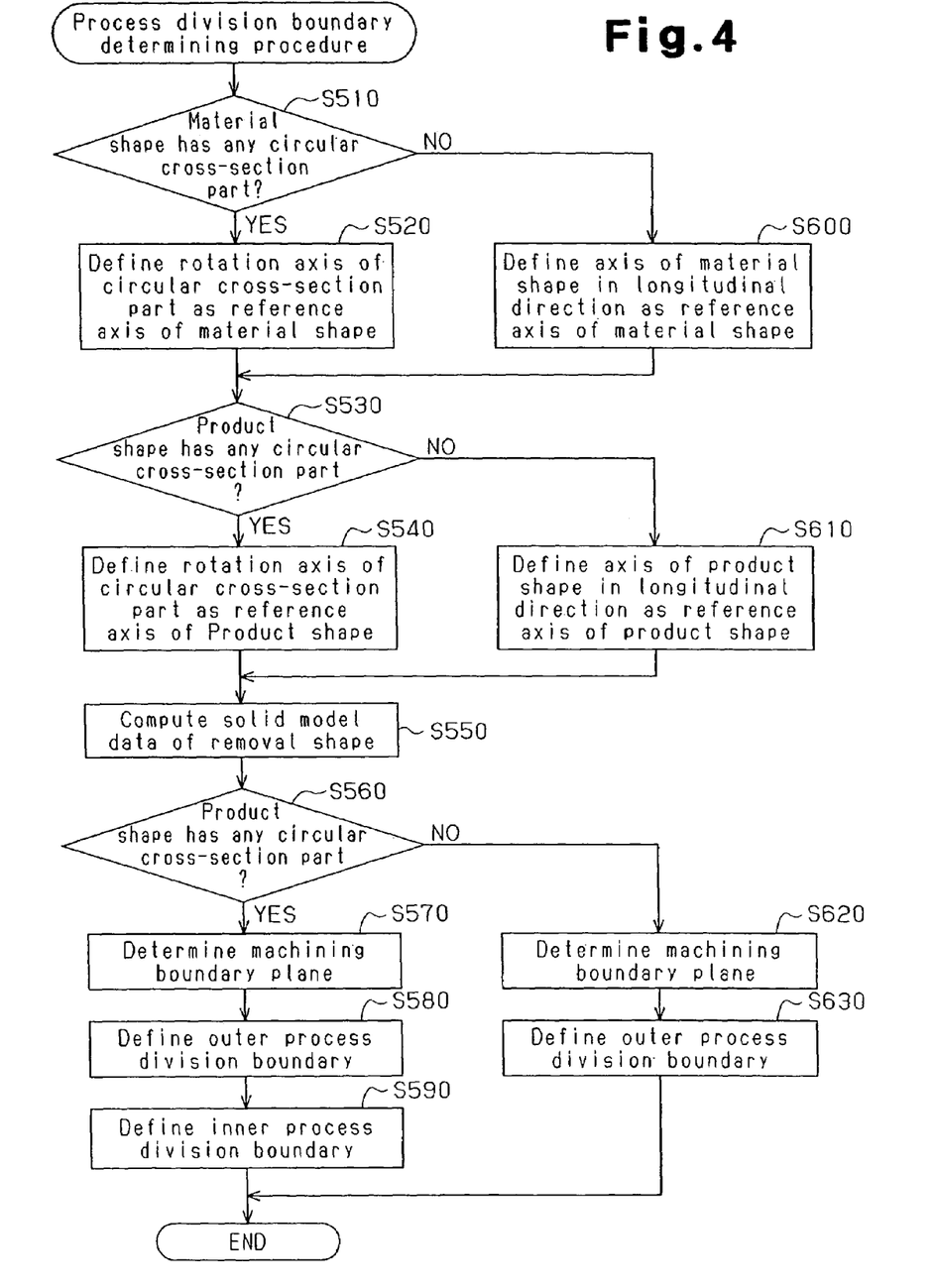
FIG. 4 is a flowchart showing a procedure for determining the process division boundary.

FIGS. 2 to 4 are flowcharts representing the NC machining programming procedure executed in accordance with the automatic programming program. The procedure is started by manipulating a start button (not shown) of the input device 110.

At steps S10 and S20 of FIG. 2, in accordance with the input instruction from the input device 110, the main control section 100 fetches the solid model data of the product shape from the product shape model memory 130 to a working memory, which is not shown, and fetches the solid model data of the material shape of the workpiece from the material shape model memory 140 to the working memory. The working memory consists of the RAM.

At step S30, in accordance with the instruction from the main control section 100, the shape analysis control section 180 determines a turning part and a milling part on the material shape. More specifically, the shape analysis control section 180 analyzes the solid model data of the product shape and the solid model data of the material shape, which are fetched as described above, and determines part of the material shape to be turned (the turning part) and part of the material shape to be milled (the milling part). The turning part corresponds to part of the workpiece (the material) that is turned while being rotated about a predetermined rotation axis, and the milling part is part other than the turning part.

A method for determining the turning part and the milling part will be described with reference to FIGS. 5 and 7. In the preferred embodiment, the material shape of the workpiece is columnar, and the workpiece is described as a rotating body having a rotation axis (a rotational center axis).

Figure 7:
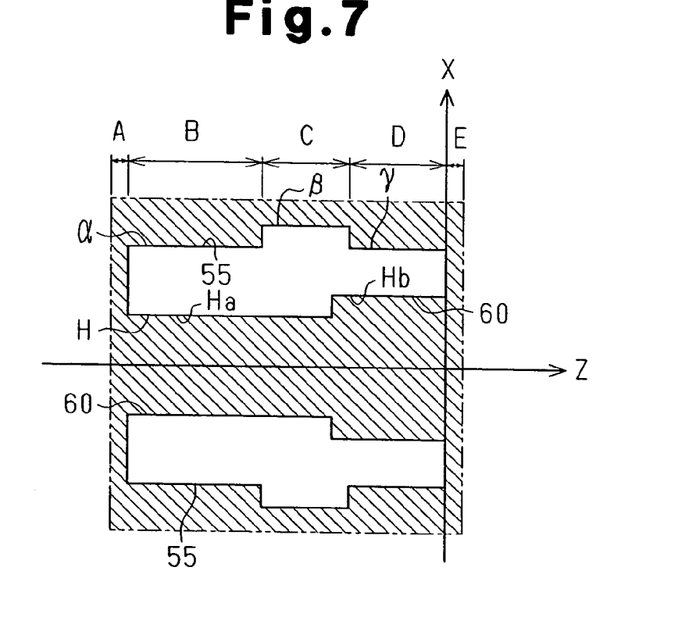
FIG. 7 is a diagram illustrating a material shape and the product shape.

FIG. 7 is a cross-sectional view showing the material shape of the workpiece according to the preferred embodiment cut along the axis (the center axis). In FIG. 7, the profile of the material shape is represented by a chain double-dashed line, and the profile of the product shape is represented by a solid line. Since the material shape is columnar, the workpiece (the material) is a rotating body the axis of which serves as the rotation axis. In FIG. 7, the rotation axis of the workpiece lies on the Z-axis. FIG. 5 is a perspective view showing the product shape. The product shape is obtained by removing the hatched area shown in FIG. 7 from the material shape. That is, the part to be removed includes parts outside the ends of the product shape in the Z-axis direction, part that is radially outward of an outer profile 55 of the product shape, and part radially inward of an inner profile 60 of the product shape.

Figure 5:
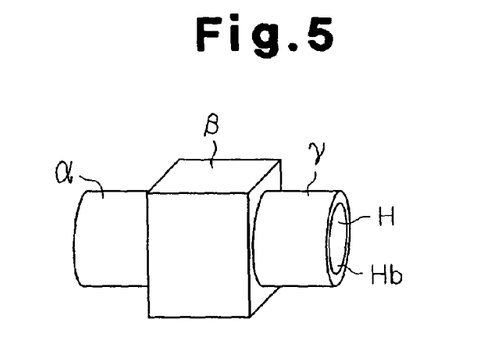
FIG. 5 is a perspective view illustrating a product shape.

As shown in FIG. 5, the product has a rectangular block-like portion at an axially middle portion β. The outer profile of the rectangular block-like portion is noncircular at a cross-section that is perpendicular to the axis of the product, and cannot be obtained through turning while rotating the workpiece. Therefore, in FIG. 7, in the part of the material shape radially outward of the outer profile 55 of the product shape, the part corresponding to the middle portion β of the product shape is determined as the milling part. Also, as shown in FIGS. 5 and 7, the product has projecting ends α, γ extending from two opposing sides of the middle portion β. The projecting ends α, γ are cylindrical bodies having a common rotation axis (the rotational center axis). The outer profile of the projecting ends α, γ are circular at the cross-section that is perpendicular to the rotation axis, and can be obtained through turning while rotating the workpiece. Therefore, as shown in FIG. 7, in the part of the material shape radially outward of the outer profile 55 of the product shape, parts corresponding to the projecting ends α, γ of the product shape are determined as the turning parts.

An axis (the center axis) specified in the middle portion β matches with the rotation axis of the projecting ends α, γ. The outer profile of the middle portion β has a noncircular cross-section, and cannot be obtained through turning while rotating the workpiece. Therefore, the axis of the middle portion β is not defined as the rotation axis. As shown in FIGS. 5 and 7, the product has a through hole H, and the axis (the center axis) of the through hole H matches with the axis (the center axis) of the product, that is, the rotation axis of the projecting ends α, γ and the axis of the middle portion β. The through hole H has a small diameter portion Ha and a large diameter portion Hb having different inner diameters.

As shown in FIG. 7, the rotation axis of part of the product shape having the outer profile with a circular cross-section (that is, the projecting ends α, γ) matches with the rotation axis of the material shape having the outer profile with a circular cross-section. That is, in the part of the material shape radially outward of the outer profile 55 of the product shape, the axial parts (the axial areas B, D shown in FIG. 7) where the axis of the circular cross-section parts of the product shape matches with the axis of the circular cross-section part of the material shape is determined as the turning part. The axial parts of the material shape that do not correspond to the product shape, that is, parts outer than the ends of the product shape in the Z-axis direction (the axial areas A, E shown in FIG. 7) are also determined as the turning part. The remaining axial part, that is, part corresponding to the middle portion β of the product shape (the axial area C shown in FIG. 7) is determined as the milling part.

As for the part of the material shape radially inward of the inner profile 60 (the profile defining the through hole H) of the product shape, the milling part and the turning part are determined in the same manner as the case of the radially outward part of the material shape. When the profile of the product shape does not have any circular cross-section part, the entire machining part of the material shape is determined to be the milling part.

At step S40 of FIG. 2, the main control section 100 determines whether the input device 110 has been operated to indicate that the second main spindle exists. The main control section 100 proceeds to step S70 when the input device 110 has not been operated to indicate that the second main spindle exists, and proceeds to step S50 when the input device 110 has been operated to indicate that the second main spindle exists.

At step S50, based on the instruction from the main control section 100, the process division control section 190 performs a process division boundary determining procedure. The process division boundary determining procedure of step S50 will be described with reference to the flowchart of FIG. 4.

At step S510, the process division control section 190 determines whether the material shape has any circular cross-section part. When the material shape has a circular cross-section part, the process division control section 190 defines the rotation axis of the circular cross-section part as the reference axis of the material shape at step S520, and proceeds to step S530. Meanwhile, when the material shape has no circular cross-section part, the process division control section 190 defines, at step S600, an axis (a center axis) of the material shape in the longitudinal direction, and defines this axis as the reference axis of the material shape. Then, the process division control section 190 proceeds to step S530.

The method for defining an axis of the material shape in the longitudinal direction at step S600 will now be described.

Figure 10:
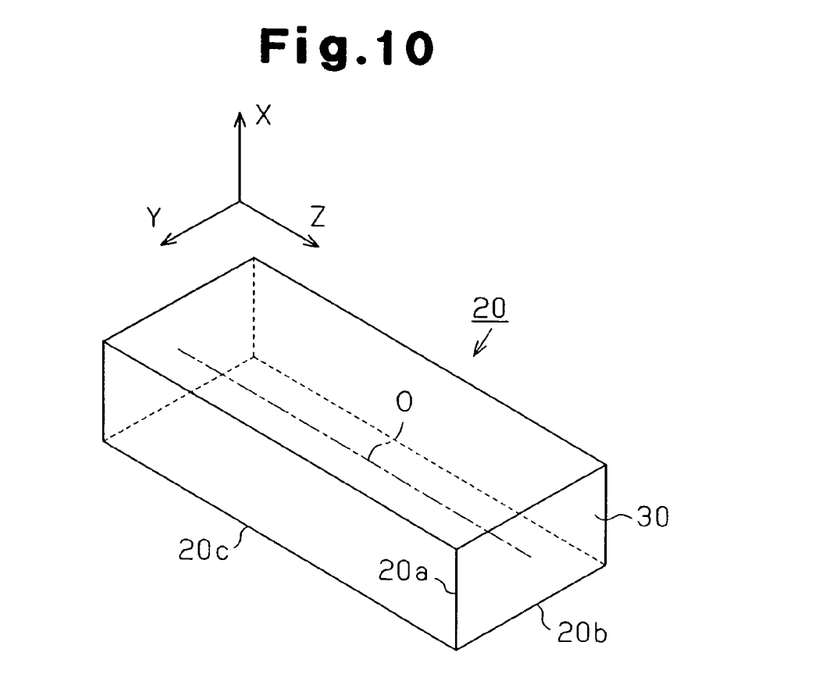
FIG. 10 is a diagram illustrating a rectangular solid circumscribing the solid model of the material shape defined on a three-dimensional coordinate system.

When the material shape does not have any circular cross-section part, a rectangular solid 20 circumscribing the solid model of the material shape is defined as shown by the three-dimensional coordinate system of FIG. 10. The rectangular solid 20 has sides 20a, 20b, and 20c, which are parallel to the respective X-axis, Y-axis, and Z-axis of the three-dimensional coordinate system. That is, the rectangular solid 20 has surfaces parallel to the XY plane, YZ plane, and ZX plane of the three-dimensional coordinate system. The lengths of the sides 20a, 20b, 20c of the rectangular solid 20 increase in the order (20a<20b<20c). Then, an axis O of the material shape in the longitudinal direction (that is, the reference axis) is defined as a straight line that is parallel to the side 20c, which is parallel to the Z-axis, and passes through the center of a surface (the surface defined by the sides 20a, 20b) 30 of the rectangular solid 20 that is perpendicular to the Z-axis.

At step S530 of FIG. 4, the process division control section 190 determines whether the product shape has any circular cross-section part. When the product shape has a circular cross-section part, the process division control section 190 defines the rotation axis of the circular cross-section part as the reference axis of the product shape at step S540, and proceeds to step S550. When the product shape has a plurality of circular cross-section parts having the rotation axes displaced from one another, the process division control section 190 defines the rotation axis of the circular cross-section part with the greatest axial length as the reference axis of the product shape.

Meanwhile, when the product shape does not have any circular cross-section part, the process division control section 190 defines the axis (the center axis) of the product shape in the longitudinal direction at step S610, and defines this axis as the reference axis of the product shape. Then, the process division control section 190 proceeds to step S550. The description for the axis defining method will be omitted since the method is the same as the axis defining method of the material shape at step S600.

At step S550, after matching the reference axis of the material shape with the reference axis of the product shape, the process division control section 190 subtracts the solid model data of the product shape from the solid model data of the material shape to compute the solid model data of the removal shape. That is, the process division control section 190 computes the removal shape based on the material shape and the product shape.

Figure 8:
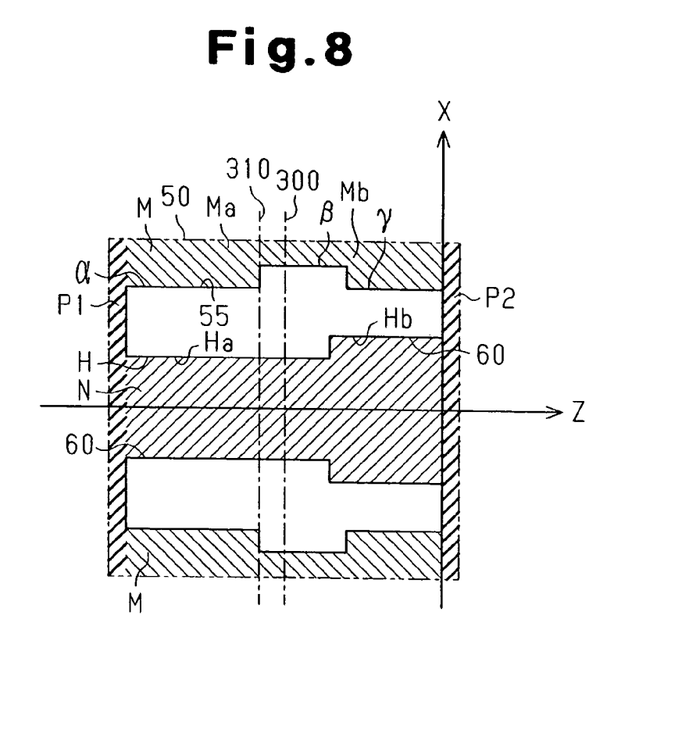
FIG. 8 is a diagram for explaining a process dividing procedure.

As shown in FIG. 8, the removal shape (the removal part) includes parts P1, P2 corresponding to the axial areas A, E shown in FIG. 7, a part (outer removal part) M surrounded by the parts P1, P2, the outer profile 50 of the material shape, and the outer profile 55 of the product shape, and a part (inner removal part) N surrounded by the parts P1, P2 and the inner profile 60 of the product shape. The shape of the part M will be referred to as the outer removal shape, and the shape of the part N will be referred to as the inner removal shape. The material shape need not have the parts P1, P2. That is, the axial length of the material shape may match with the axial length of the product shape.

At step S560, the process division control section 190 determines whether the product shape has any circular cross-section part. When the product shape has a circular cross-section part, the process division control section 190 determines, at step S570, a machining boundary plane 300 (see FIG. 8) that is perpendicular to the reference axis of the product shape (that is, also perpendicular to the reference axis of the material shape) such that the volume of the outer removal shape (the outer removal part M) is divided into two equal parts in the axial direction. The machining boundary plane 300 corresponds to a reference machining boundary that intersects the reference axis of the product shape.

At step S580, among portions where the outer profile 55 of the product shape changes (the profile changing portions), the process division control section 190 searches for the profile changing portion closest to the machining boundary plane 300, and defines a plane that passes through this profile changing portion and is parallel to the machining boundary plane 300 as an outer process division boundary 310 (see FIG. 8).

That is, the process division control section 190 defines, on the removal shape, the process division boundary that intersects the reference axis of the product shape based on the reference machining boundary and the profile of the product shape.

The profile changing portions refer to portions where the distance between the reference axis of the product shape and the profile of the product shape (including the outer profile 55 and the inner profile 60) changes non-linearly along the reference axis. In the example of FIG. 8, as for the outer profile 55 of the product shape, step portions between the middle portion β and the projecting ends α, γ correspond to the profile changing portions, and as for the inner profile 60 of the product shape, a step portion between the small diameter portion Ha and the large diameter portion Hb of the through hole H corresponds to the profile changing portion. However, the profile changing portions are not limited to such step portions. Note that, for example, when the outer profile of the product shape is a conic surface, since the distance between the reference axis of the product shape and the outer profile of the product shape changes linearly along the reference axis, the outer profile having such a conic surface does not correspond to the profile changing portion.

In the example of FIG. 8, at step S580, the outer process division boundary 310 is specified between the middle portion β and one of the projecting ends α, γ (in this example, the projecting end a). In other words, the outer process division boundary 310 is specified between the milling part corresponding to the middle portion β and the turning part corresponding to the projecting end α. The outer process division boundary 310 divides the outer removal shape (the outer removal part M) into a first part Mb removed in the first process and a second part Ma removed in the second process.

When the outer profile of the product shape does not have any profile changing portion, for example, when the outer profile is columnar and has a diameter constant in the entire axial direction, or when the outer profile is conical and has a diameter that changes linearly along the axial direction, the process division control section 190 determines the machining boundary plane 300 as the outer process division boundary 310 at step S580.

Next, at step S590, in the same manner as the procedure for determining the machining boundary plane 300 and the process division boundary 310 for the outer removal shape (outer removal part M), the process division control section 190 determines a machining boundary plane 400 and a process division boundary 410 for the inner removal shape (inner removal part N). That is, the process division control section 190 determines the machining boundary plane 400 (see FIG. 9) that is perpendicular to the reference axis of the product shape (that is, also perpendicular to the reference axis of the material shape) such that the volume of the inner removal shape (the inner removal part N) is divided into two equal parts in the axial direction. The machining boundary plane 400 corresponds to a reference machining boundary that intersects the reference axis of the product shape. Subsequently, among portions where the inner profile 60 of the product shape changes (the profile changing portions), the process division control section 190 searches for the profile changing portion closest to the machining boundary plane 400, and defines a plane that passes through this profile changing portion and is parallel to the machining boundary plane 400 as the inner process division boundary 410 (see FIG. 9).

Figure 9:
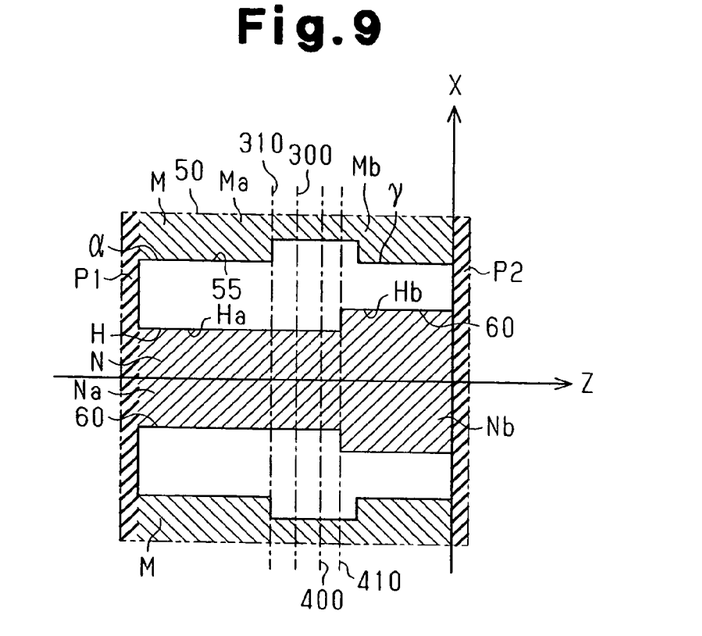
FIG. 9 is a diagram for explaining the process dividing procedure.

In the example of FIG. 9, the inner process division boundary 410 is specified between the small diameter portion Ha and the large diameter portion Hb of the through hole H. In other words, the inner process division boundary 410 is specified between the turning part corresponding to the small diameter portion Ha and the turning part corresponding to the large diameter portion Hb. The inner process division boundary 410 divides the inner removal shape (the inner removal part N) into a first part Nb removed in the first process and a second part Na removed in the second process.

When the inner profile of the product shape does not have any profile changing portion, for example, when the inner profile is columnar and has a diameter that is constant in the entire axial direction, or when the inner profile is conical and has a diameter that changes linearly along the axial direction, the process division control section 190 determines the machining boundary plane 400 as the inner process division boundary 410.

After completing the process of step S590, the process division control section 190 ends the process division boundary determining procedure.

Meanwhile, when it is determined that the product shape does not have any circular cross-section part at step S560, the process division control section 190 proceeds to step S620 and determines, in the same manner as step S570, the machining boundary plane (the reference machining boundary) 300 that is perpendicular to the reference axis of the product shape (the reference axis of the material shape) such that the volume of the outer removal shape (the outer removal part M) is divided into two equal parts in the axial direction.

At step S630, in the same manner as step S580, among the profile changing portions of the outer profile 55 of the product shape, the process division control section 190 searches for the profile changing portion closest to the machining boundary plane 300, and defines a plane that passes through this profile changing portion and is parallel to the machining boundary plane 300 as the outer process division boundary 310. When the outer profile 55 of the product shape does not have any profile changing portion, the process division control section 190 defines the machining boundary plane 300 as the outer process division boundary 310.

After completing the process of step S630, the process division control section 190 ends the process division boundary determining procedure.

When the removal shape does not have the outer removal shape (the outer removal part M), the processes of steps S570, S580, S620, S630 are not performed. When the removal shape does not have the inner removal shape (the inner removal part N), the process of step S590 is not performed.

The description returns to the flowchart of FIG. 2. At step S60, the main control section 100 turns on a second process flag. At step S70, the main control section 100 determines the states of various machining flags of the first process in accordance with instructions input by the operator using the input device 110 corresponding to items indicated on the display 170. The various machining flags include, for example, flags for drilling, first end face turning, outer diameter turning, face milling, inner diameter turning, line machining, point machining, and chamfering.

The drilling is a process for forming a pilot hole in the material (the workpiece) before forming a through hole when the product shape has a through hole extending along the reference axis. The first end face turning is a process for turning the end face of the end portion of the material not held by the chuck of the first main spindle. The outer diameter turning is a process for turning the material to obtain the outer circumferential surface having a circular cross-section. The face milling is a process for generating flat surfaces on the material using a face mill. The inner diameter turning is a process for turning the inner circumferential surface of the pilot hole to obtain the through hole. The line machining is a process performed using an end mill. The point machining is a process for forming a hole using, for example, a drill. The chamfering is a process performed using a mill.

At step S80, the main control section 100 determines whether the second process flag is on. When the second process flag is not on, the main control section 100 proceeds to step S110 of FIG. 3, and when the second process flag is on, the main control section 100 turn a transfer flag on at step S90, and then proceeds to step S100.

At step S100, the main control section 100 determines the states of various machining flags of the second process in accordance with instructions input by the operator using the input device 110 corresponding to items indicated on the display 170. Thereafter, the main control section 100 proceeds to step S110 of FIG. 3. The various machining flags include, for example, flags for second end face turning, outer diameter turning, face milling, inner diameter turning, line machining, point machining, and chamfering.

The second end face turning is a process for turning the end face of the end portion of the material not held by the chuck of the second main spindle. Other processes are as described above.

Figure 6:
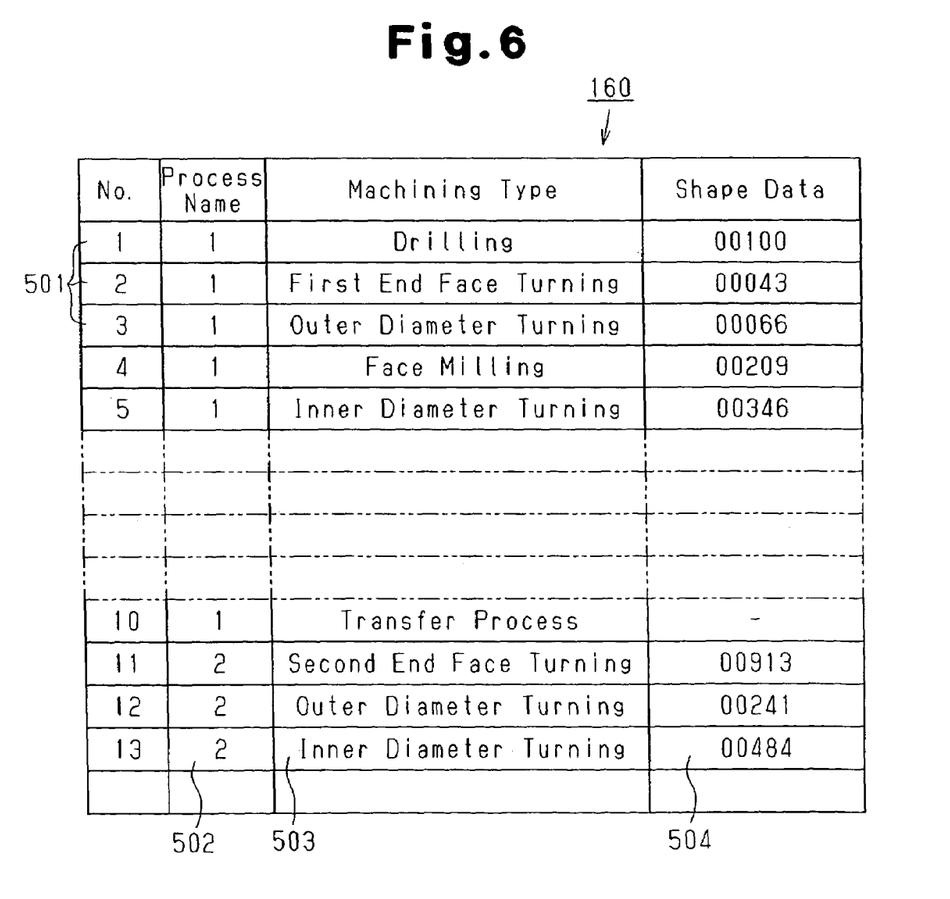
FIG. 6 is a diagram for explaining the process memory.

At step S110, based on the various machining flags, the states of which have been determined at step S70, the main control section 100 stores various data required for executing the first process in the process memory 160. That is, the main control section 100 extracts machining parts corresponding to the various machining flags from part of the product shape to be machined in the first process. Then, as shown in FIG. 6, the main control section 100 stores, in the process memory 160, the number of the execution block, the process name, the machining type, and the shape data of the machining part in the NC machining program corresponding to each of the extracted machining parts. The shape data is stored, for example, in the form of an address in the product shape model memory 130, which stores the solid model data of the product shape. That is, among a plurality of addresses of the product shape model memory 130, the addresses of the model data corresponding to the extracted machining parts are stored in the process memory 160 as the shape data.

As shown in FIG. 6, the process memory 160 has an execution block number storage area 501, a process name storage area 502, a machining type storage area 503, and a shape data storage area 504. FIG. 6 represents a state where various data required to obtain the product shape shown in FIGS. 7 to 9 from the material shape shown in FIGS. 7 to 9 being stored in the process memory 160.

That is, as shown in FIG. 6, when the machining flag for turning and drilling is set on, an execution block number "1" is stored in the execution block number storage area 501. Corresponding to the execution block number "1", "1" representing the first process is stored in the process name storage area 502, "drilling" is stored in the machining type storage area 503, and the associated address is stored in the shape data storage area 504. The NC machine tool performs machining based on the execution block "1", a pilot hole extending along the reference axis that lies on the Z-axis is drilled in the material shape of FIG. 8.

Also, when the machining flag for the first end face turning is set on, an execution block number "2" is stored in the execution block number storage area 501 of FIG. 6. Corresponding to the execution block number "2", "1" representing the first process is stored in the process name storage area 502, "first end face turning" is stored in the machining type storage area 503, and the associated address is stored in the shape data storage area 504. Based on the execution block "2", the NC machine tool performs machining so that the material shape of FIG. 8 is turned to remove the turning part P2 corresponding to the area E shown in FIG. 7.

Also, when the machining flag for the outer diameter turning is set on, the execution block number "3" is stored in the execution block number storage area 501 of FIG. 6. Corresponding to the execution block number "3", "1" representing the first process is stored in the process name storage area 502, "outer diameter turning" is stored in the machining type storage area 503, and the associated address is stored in the shape data storage area 504. Based on the execution block "3", the NC machine tool performs machining so that the material shape of FIG. 8 is turned to remove the turning part corresponding to the area D shown in FIG. 7 in the first part Mb of the outer removal part M.

Also, when the machining flag for the face milling is set on, the execution block number "4" is stored in the execution block number storage area 501 of FIG. 6. Corresponding to the execution block number "4", "1" representing the first process is stored in the process name storage area 502, "face milling" is stored in the machining type storage area 503, and the associated address is stored in the shape data storage area 504. Based on the execution block "4", the NC machine tool performs machining so that the material shape of FIG. 8 is subjected to surface cutting to remove the milling part corresponding to the area C shown in FIG. 7 in the first part Mb of the outer removal part M.

Also, when the machining flag for the inner diameter turning is set on, the execution block number "5" is stored in the execution block number storage area 501 of FIG. 6. Corresponding to the execution block number "5", "1" representing the first process is stored in the process name storage area 502, "inner diameter turning" is stored in the machining type storage area 503, and the associated address is stored in the shape data storage area 504. Based on the execution block "5", the NC machine tool performs machining so that the material shape of FIG. 9 is turned to remove the first part Nb of the inner removal part N.

At step S120 of FIG. 3, the main control section 100 determines whether the transfer flag is on. When the transfer flag is not on, the main control section 100 ends this routine. Meanwhile, when the transfer flag is on, the main control section 100 proceeds to step S130 and stores, in the process memory 160, a flag representing the process for transferring the material (the workpiece) from the first main spindle to the second main spindle. In the example of FIG. 6, when the transfer flag is set on, the execution block number "10" is stored in the execution block number storage area 501. The flag representing the transfer process is set in the machining type storage area 503 corresponding to the execution block number "10". Based on this flag, the NC machining apparatus transfers the material (the workpiece) from the first main spindle to the second main spindle when the first process ends.

At step S130, the main control section 100 further stores, based on the various machining flags, the states of which have been determined at step S100, various data required to perform the second process in the process memory 160. That is, in the same manner as the above mentioned case of step 110, the main control section 100 extracts machining parts corresponding to various machining flags from part of the product shape to be machined in the second process. As shown in FIG. 6, the main control section 100 stores, in the process memory 160, the number of the execution block, the process name, the machining type, and the shape data of the machining part (the address in the product shape model memory 130) in the NC machining program corresponding to each of the extracted machining parts.

As exemplified in FIG. 6, when the machining flag for the second end face turning is set on, the execution block number "11" is stored in the execution block number storage area 501. Corresponding to the execution block number "11", "2" representing the second process is stored in the process name storage area 502, "second end face turning" is stored in the machining type storage area 503, and the associated address is stored in the shape data storage area 504. Based on the execution block "11", the NC machine tool performs machining so that the material shape of FIG. 8 is turned to remove a turning part P1 corresponding to the area A shown in FIG. 7.

Also, when the machining flag for the outer diameter turning is set on, the execution block number "12" is stored in the execution block number storage area 501 of FIG. 6. Corresponding to the execution block number "12", "2" representing the second process is stored in the process name storage area 502, "outer diameter turning" is stored in the machining type storage area 503, and the associated address is stored in the shape data storage area 504. Based on the execution block "12", the NC machine tool performs machining so that the material shape of FIG. 8 is turned to remove the turning part corresponding to the are B shown in FIG. 7 in the second part Ma of the outer removal part M.

Also, when the machining flag for the inner diameter turning is set on, the execution block number "13" is stored in the execution block number storage area 501 of FIG. 6. Corresponding to the execution block number "13", "2" representing the second process is stored in the process name storage area 502, "inner diameter turning" is stored in the machining type storage area 503, and the associated address is stored in the shape data storage area 504. Based on the execution block "13", the NC machine tool performs machining so that the material shape of FIG. 9 is turned to remove the second part Na of the inner removal part N.

Thereafter, the main control section 100 ends this routine.

As described above, in the preferred embodiment, the machining boundary plane 300 that divides the volume of the outer removal shape (the outer removal part M) into two equal parts is defined. Based on the machining boundary plane 300 or the outer process division boundary 310 closest to the machining boundary plane 300, the machining process of the outer removal shape is divided into the first process and the second process. Also, the machining boundary plane 400 that divides the volume of the inner removal shape (inner removal shape N) into two equal parts is defined. Based on the machining boundary plane 400 or the inner process division boundary 410 closest to the machining boundary plane 400, the machining process of the inner removal shape is divided into the first process and the second process. As a result, when creating the NC machining program for the NC machine tool having two main spindles facing each other, the NC machining program that improves the machining efficiency of the NC machine tool is automatically created. By machining in accordance with this NC machining program, the machining time required for the first process and the machining time required for the second process are substantially equalized in machining of the outer removal shape and the inner removal shape.

The preferred embodiment may be modified as follows.

When the distance between the reference machining boundary (the machining boundary planes 300, 400) and the profile changing portion of the product shape closest to the reference machining boundary (that is, the process division boundaries 310, 410) is greater than or equal to a predetermined threshold value, the reference machining boundary may be defined as a process division boundary line.

In a case where the distance between the reference machining boundary and the profile changing portion closest to the reference machining boundary is greater than or equal to the threshold value, when the profile changing portion is defined as the process division boundary, a significant difference is made between the volume of the removal part corresponding to the first process and the volume of the removal part corresponding to the second process. This causes a significant difference between the machining time required for the first process and the machining time required for the second process. Therefore, providing the threshold value for the distance between the reference machining boundary and the profile changing portion closest to the reference machining boundary prevents a significant difference from being caused between the machining time required for the first process and the machining time required for the second process.

In this specification, the term "rotating body" refers to a solid obtained by rotating a figure on a two-dimensional plane about an arbitrary straight line defined on this plane serving as a rotation axis, and includes, for example, a sphere, a column, a cone, and a truncated cone.

The invention claimed is:

1. A method for automatically dividing a machining process executed to obtain a predetermined product shape from a material shape of a workpiece, wherein the method is applied to an automatic programming apparatus, the method comprising:
    computing a removal shape, which is a shape to be removed from the material shape when executing the machining process, based on the material shape and the product shape;
    determining a reference machining boundary that intersects a reference axis defined on the product shape and divides the volume of the removal shape into two equal parts;
    searching the product shape to find out whether there is at least one profile changing portion along the reference axis;
    defining, on the removal shape, a process division boundary that intersects the reference axis, based on the reference machining boundary and the profile of the product shape, wherein when the profile changing portion exists, the process division boundary is defined such that the process division boundary passes through the profile changing portion closest to the reference machining boundary, and wherein, when there is no profile changing portion, the reference machining boundary is defined as the process division boundary; and
    dividing the machining process into a first process and a second process with the process division boundary.

2. The method according to claim 1, wherein a portion where the distance between the reference axis and the profile of the product shape changes non-linearly along the reference axis is defined as the profile changing portion.

3. The method according to claim 1, wherein, when the distance between the reference machining boundary and the profile changing portion closest to the reference machining boundary is greater than or equal to a predetermined threshold value, the reference machining boundary is defined as the process division boundary.

4. The method according to claim 1, wherein the product shape has a circular cross-section part, and a center axis of the circular cross-section part is defined as the reference axis.

5. The method according to claim 1, wherein the material shape and the product shape each has an outer profile, and the removal shape includes a part defined by the outer profile of the material shape and the outer profile of the product shape.

6. The method according to claim 1, wherein the product shape has an inner profile, and the removal shape includes a part defined by the inner profile.

7. An apparatus for automatically dividing a machining process executed to obtain a predetermined product shape from a material shape of a workpiece, wherein the apparatus is applied to an automatic programming apparatus, the apparatus comprising:
    a removal shape computing section, wherein the removal shape computing section computes a removal shape, which is a shape to be removed from the material shape when executing the machining process, based on the material shape and the product shape;
    a reference machining boundary determining section, which defines a reference machining boundary that intersects a reference axis defined on the product shape and divides the volume of the removal shape into two equal parts;
    a process division boundary defining section that defines, on the removal shape, a process division boundary that intersects the reference axis based on the reference machining boundary and the profile of the product shape, wherein the process division boundary defining section searches the product shape to find out whether there is at least one profile changing portion along the reference axis, wherein, when the profile changing portion exists, the process division boundary defining section defines the process division boundary such that the process division boundary passes through the profile changing portion closest to the reference machining boundary, and wherein, when there is no profile changing portion, the process division boundary defining section defines the reference machining boundary as the process division boundary; and
    a process dividing section, which divides the machining process into a first process and a second process with the process division boundary.

8. The apparatus according to claim 7, wherein the process division boundary defining section defines a portion where the distance between the reference axis and the profile of the product shape changes non-linearly along the reference axis as the profile changing portion.

9. The apparatus according to claim 7, wherein, when the distance between the reference machining boundary and the profile changing portion closest to the reference machining boundary is greater than or equal to a predetermined threshold value, the process division boundary defining section defines the reference machining boundary as the process division boundary.

10. The apparatus according to claim 7, wherein the product shape has a circular cross-section part, and a center axis of the circular cross-section part is defined as the reference axis.

11. The apparatus according to claim 7, wherein the material shape and the product shape each has an outer profile, and the removal shape includes a part defined by the outer profile of the material shape and the outer profile of the product shape.

12. The apparatus according to claim 7, wherein the product shape has an inner profile, and the removal shape includes a part defined by the inner profile.

* * * * *